United States Patent
Chen et al.

(10) Patent No.: US 8,275,422 B2
(45) Date of Patent: Sep. 25, 2012

(54) SYSTEM AND METHOD FOR CONTROLLING THE USE OF A HANDSET COMMUNICATION DEVICE

(75) Inventors: Xiao Y. Chen, Beijing (CN); Jie X. Jiao, Beijing (CN); Song Song, Beijing (CN); Xiao F. Wang, Beijing (CN); Ying Wang, Beijing (CN); Yu D. Yang, Beijing (CN); James T. Yeh, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 13/029,486

(22) Filed: Feb. 17, 2011

(65) Prior Publication Data

US 2011/0207448 A1 Aug. 25, 2011

(30) Foreign Application Priority Data

Feb. 23, 2010 (CN) .......................... 2010 1 0115823

(51) Int. Cl.
*H04M 1/00* (2006.01)
(52) U.S. Cl. ............... 455/569.2; 455/414.1; 455/569.1; 455/575.9; 340/901; 340/995.28; 340/933; 340/988

(58) Field of Classification Search ............. 455/414.12, 455/569.1–569.2, 575.9; 340/901–905, 933–939, 340/988–994, 995.28, 995.11–995.19
See application file for complete search history.

(56) References Cited

U.S. PATENT DOCUMENTS

| | | | |
|---|---|---|---|
| 6,262,657 B1 | 7/2001 | Okuda et al. | |
| 6,311,078 B1 * | 10/2001 | Hardouin | 455/567 |
| 2007/0182529 A1 * | 8/2007 | Dobler et al. | 340/438 |
| 2008/0305735 A1 * | 12/2008 | Farnsworth et al. | 455/1 |

FOREIGN PATENT DOCUMENTS

CN 1980565 A 6/2007

* cited by examiner

*Primary Examiner* — Wayne Cai
(74) *Attorney, Agent, or Firm* — Hoffman Warnick LLC; Douglas A. Lashmit (57) ABSTRACT

The invention provides a system and method for controlling use of handset communication device for communication by driver. A system in accordance with an embodiment includes: an obtaining component for obtaining driving state information of the vehicle; a directional antenna for capturing a wireless communication signal of the handset communication device around the driver; a judging component for judging whether a driving state of the vehicle is in an unstable state based on predefined criteria and the driving state information of the vehicle; and a control component for transmitting a remote control signal, based on a judging result of the judging component, to intervene in a communication of the handset communication device during a call.

16 Claims, 7 Drawing Sheets

SYSTEM AND METHOD FOR CONTROLLING THE USE OF A HANDSET COMMUNICATION DEVICE

FIELD OF THE INVENTION

The invention generally relates to an automatic control system and method, and in particular, the invention relates to a system and method for controlling the use of a handset communication device by a driver.

BACKGROUND OF THE INVENTION

It can be dangerous for a driver to use a handset communication device while driving, since the attention of the driver can be significant impaired while communicating using a handset communication device. This may lead to a traffic accident, thus causing personal injury and property loss to the driver, passenger and other people. Therefore, many countries, including China, England, Canada, the United States, etc., have promulgated relevant regulations to inhibit or restrict a driver's use of a handset communication device. Many prior art techniques have been proposed to control a driver's use of a handset communication device.

U.S. Pat. No. 6,262,657 discloses a driver alert system for controlling a driver's handset usage while in a dangerous driving state. A face image of a driver is captured by a CCD camera. An image processing unit is used to judge whether the driver is using a handset while driving by comparing the face image of the driver with a face image of the driver when not using a handset. A call detecting unit is also used to determine whether the driver is using a handset while driving by detecting the strength of a wireless signal transmitted from the handset.

CN 1980565A discloses an in-vehicle radio wave shielding apparatus which comprises detecting means for detecting whether a vehicle is in moving state, controlling means for judging whether the vehicle is in moving state, and shielding wave transmitting means. An output of the detecting means is connected to an input of the controlling means, an output of the controlling means is connected to an input of the shielding wave transmitting means, and a jammer is installed above the driver. Depending on whether the vehicle is in a moving state, the jammer transmits a shielding wave to shield radio waves of a certain frequency around the driver.

SUMMARY OF THE INVENTION

The invention provides a system and method for controlling the use of a handset communication device by a driver. The invention can accurately judge using a directional antenna whether the driver is communicating via the handset communication device and can control that communication. Judgments made using the directional antenna are highly accurate. Also, by transmitting a remote control signal, the invention can intervene in a communication of the handset communication device during a call, thereby, for example, avoiding long term radiation injury to the driver due to the continuous transmission of a short-range shielding wave as in the prior art.

The invention provides a system for controlling the use of a handset communication device for communication by a driver of a vehicle while the vehicle is in a driving state. The controlling system comprises: an obtaining component for obtaining driving state information of the vehicle; a directional antenna for capturing a wireless communication signal of the handset communication device around the driver; a judging component for judging whether the driving state of the vehicle is in an unstable state based on predefined criteria and the driving state information of the vehicle; and a control component for transmitting a remote control signal based on a judging result of the judging component to intervene in a communication of the handset communication device during a call.

The invention also provides a vehicle comprising: a detecting component for detecting driving state information of the vehicle; and a system for controlling a driver's communication via a handset communication device while the vehicle is in a driving state. The controlling system comprises: an obtaining component for obtaining driving state information of the vehicle; a directional antenna for capturing a wireless communication signal of the handset communication device around the driver; a judging component for judging whether the driving state of the vehicle is in an unstable state based on predefined criteria and the driving state information of the vehicle; and a control component for transmitting a remote control signal based on a judging result of the judging component to intervene in a communication of the handset communication device during a call. as described above.

The invention also provides a method for controlling the use of a handset communication device for communication by a driver of a vehicle while the vehicle is in a driving state. The controlling method comprises: obtaining driving state information of the vehicle; capturing a wireless communication signal of the handset communication device around the driver; judging whether the driving state of the vehicle is in an unstable state based on predefined criteria and the driving state information of the vehicle; and transmitting a remote control signal based on the judging result to intervene in a communication of the handset communication device during a call.

BRIEF DESCRIPTION OF THE DRAWINGS

Drawings referenced in the description are merely used to illustrate typical embodiments of the invention and should not be considered as limitation to scope of the invention.

DETAILED DESCRIPTION OF THE INVENTION

Figure 1:
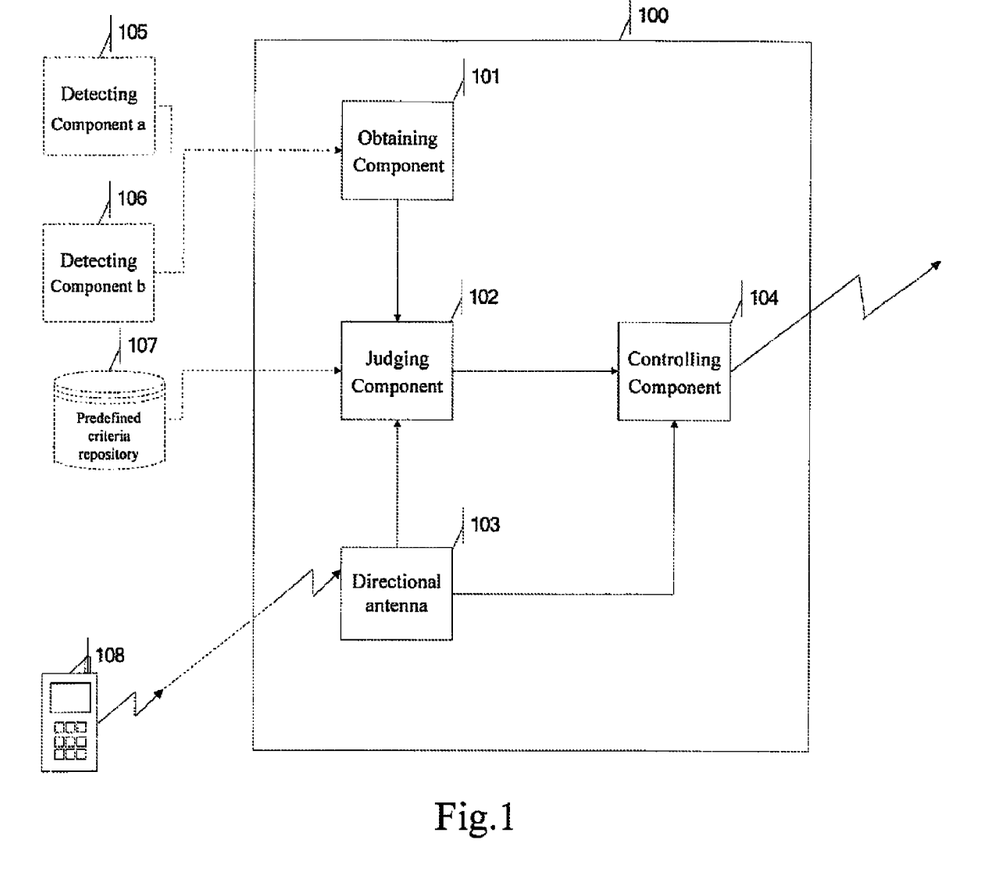
FIG. 1 shows a block diagram of a system for controlling the use of a handset communication device for communication by a driver while a vehicle is in driving state according to an embodiment of the invention.

FIG. 1 shows a block diagram of a system 100 for controlling the use of a handset communication device 108 for communication by a driver while a vehicle is in driving state according to an embodiment of the invention. System 100 in FIG. 1 comprises an obtaining component 101, a directional antenna 103, a judging component 102, and a control component 104.

The obtaining component 101 is used to obtain driving state information of the vehicle. The obtaining component 101 can obtain driving state information of the vehicle via at least one detecting component, such as detecting components a and b in FIG. 1. Those skilled in the art will appreciate that there may be one or more detecting components for detecting one or more items of driving state information of the vehicle. The detecting component may be part of system 100, or may not be part of system 100, in which case an existing detecting component of the vehicle may be utilized to accomplish the detection operation.

The driving state information of the vehicle may comprise internal and/or external data of the vehicle. The internal data of the vehicle may comprise, for example, at least one of the following: speed, acceleration, gear position, gas pedal pressure, brake pedal pressure, steering wheel rotation angle, wheel angle, etc. The external data of the vehicle may comprise, for example, at least one of the following: distance from an object at the front of the vehicle, moving speed of an object at the front of the vehicle, etc.

The directional antenna 103 is used to capture a wireless communication signal of a handset communication device 108 around driver. The captured wireless communication signal is transmitted to the control component 104.

The judging component 102 is used to judge whether the driving state of the vehicle is in an unstable state based on predefined criteria. According to an embodiment of the invention, when the speed of the vehicle exceeds a certain threshold, the vehicle is considered to be in an unstable state. To this extent, control will be applied to the driver's use of the handset communication device 108. According to another embodiment of the invention, although the speed of the vehicle may not exceed a certain threshold (such as 80 km/hr), the speed curve of the vehicle may change in an unsafe and unstable manner due to the use of a handset communication device 108 by the driver. Thus, it is judged that the driving state of vehicle is unstable, indicating that the driver's use of the handset communication device 108 needs to be controlled.

According to yet another embodiment of the invention, by measuring a distance from an object at the front (such as a vehicle at the front) or by measuring the moving speed of an object at the front, it can be judged whether the present vehicle should be braking to reduce its speed. When the present vehicle should apply its brakes, but has not, or when the present vehicle should decelerate in advance but has not decelerated in advance (such as a vehicle at the front has decelerated rapidly or a distance from a vehicle at the front to the present vehicle is very close), it can be judged that the driving state of vehicle is unstable, and, at this time, if the driver is using handset communication device 108, then the system will intervene in the communication.

In embodiments, the judging component 102 can perform judgment regardless of whether the directional antenna 103 has received a wireless communication signal. Such judgment can include, for example, whether the speed of the vehicle exceeds a certain threshold, whether the speed curve of the vehicle changes more than a certain amount within two time windows, or whether the vehicle should decelerate but does not decelerate and so on. In other embodiments, the judging component 102 can provide a judgment only after the directional antenna 103 has received a wireless communication signal and it is judged that the speed of vehicle exceeds a certain threshold, that the speed curve of the vehicle changes more than a certain amount within two time windows before and after the vehicle receives the wireless communication signal, and/or that the vehicle should decelerate but does not decelerate after the vehicle receives wireless communication signal, and so on.

Those skilled in the art can appreciate that the predefined criteria may be modified as needed, and the invention can use one or more items of external data of the vehicle, or one or more items of internal data of the vehicle, or comprehensively consider internal and external data of the vehicle as needed, in judging whether the vehicle is in an unstable state.

The predefined criteria may be stored in a predefined criteria repository 107. The predefined criteria repository 107 may be part of system 100, or may be a component external to system 100. If the predefined criteria repository 107 is a component external to system 100, it may be stored, for example, locally (e.g., within the vehicle) or on a remote server via a network. The predefined criteria may be customized or updated, and a traffic management department may also make compulsive regulation on the predefined criteria.

The controlling component 104 can be used to transmit a remote control signal according to the identification information of the handset communication device 108. This may be done based on the judging result of the judging component 102 to intervene in the handset communication device 108 during a call in the case that the directional antenna 103 captures a wireless communication signal. The control system 104 can obtain user identification information such as an IMSI (International Mobile Subscriber Identifier) or MSISDN (Mobile Subscriber Integrated Services Digital Network Number) by decrypting the communication signal of the handset communication device 108 captured by the directional antenna 103.

According to an embodiment of the invention, the control component 104 transmits a control signal to a telecommunication operator according to the user identification information, so as to send an alert tone to the driver via the handset communication device 108. For example, a special alert tone (e.g., music or speech) can be sent to the handset communication device 108 of the driver during a call by utilizing a base station. Further, the control component 104 can also send an alert tone to the counterpart handset communication device that is communicating with the driver during the call by utilizing a base station. According to another embodiment of the invention, the control component 104 can also transmit a control signal to a telecommunication operator in order to terminate the call to the handset communication device 108. Rather than install a shielding wave generator over a driver's head as in the prior art, the present invention can transmit a remote control signal (e.g., to a telecommunication operator) to control (e.g., terminate) the call of the handset communication device 108.

Figure 2:
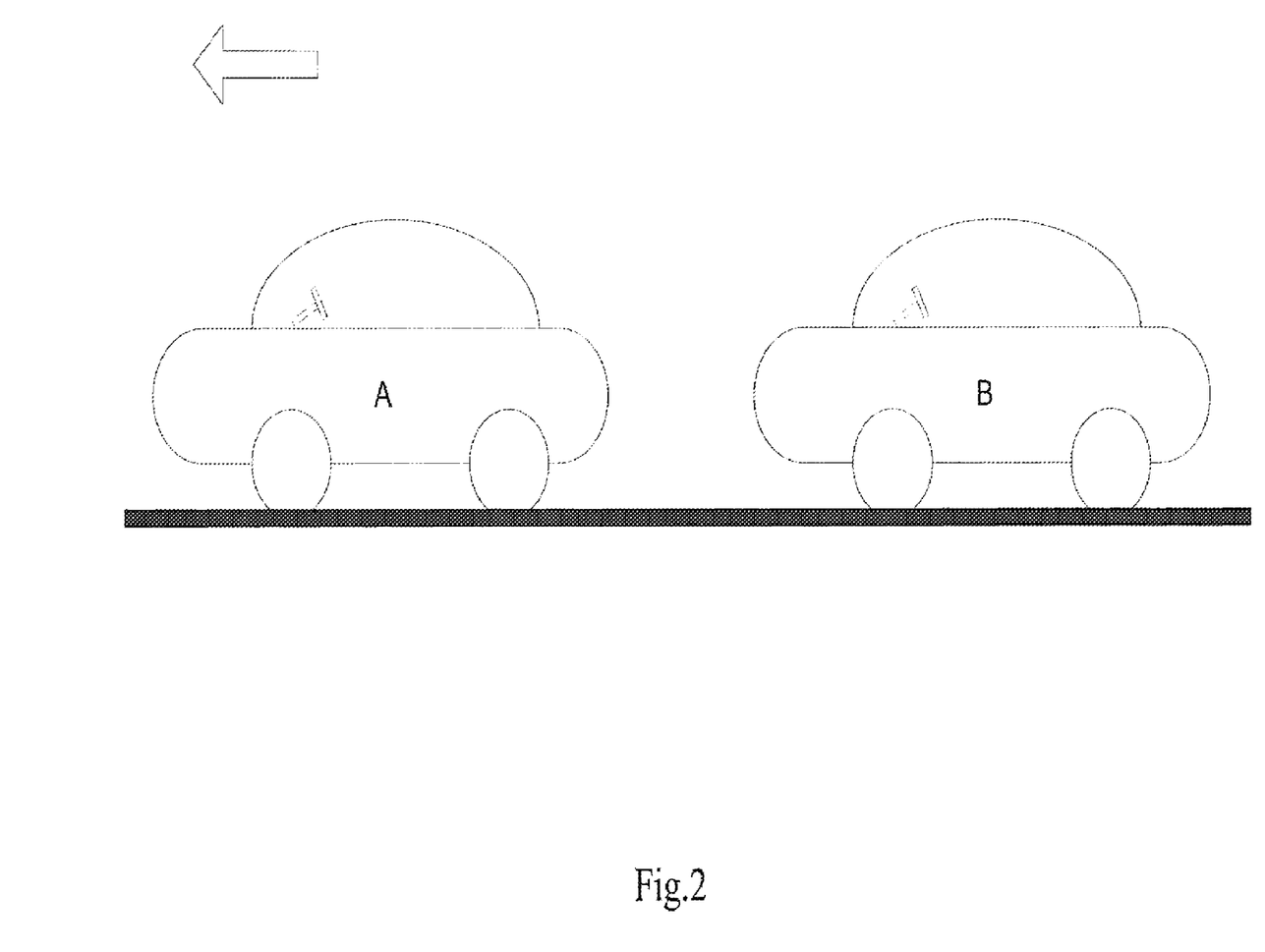
FIG. 2 depicts the judging of whether a driving state of a vehicle is in an unstable state according to an embodiment of the invention.

FIG. 2 depicts the judging of whether a driving state of a vehicle is in an unstable state according to an embodiment of the invention. As mentioned above, if a vehicle A at the front has decelerated and the present vehicle B does not notice the fact that vehicle A at the front has decelerated due to the driver communicating via a handset communication device, then the present vehicle B may be in an unstable state. Thus, the invention detects the distance between vehicle A at the front or other objects and the present vehicle B or the speed of vehicle A at the front or other objects, so as to find potential danger as early as possible and warn the driver. According to an embodiment of the invention, the external data of the vehicle can be obtained via a radio wave sensor, infrared sensor, or optical sensor, etc. Most radar (radio wave sensor)

available on the market use a time difference between transmission and return of a radio wave pulse to compute the distance from an object at the front or the moving speed of an object at the front. An infrared sensor uses the time difference between transmission and return of an infrared wave to compute the distance from an object at the front or the moving speed of an object at the front. An optical sensor uses a video image process to determine the distance from an object at the front or the moving speed of an object at the front.

Figure 3:
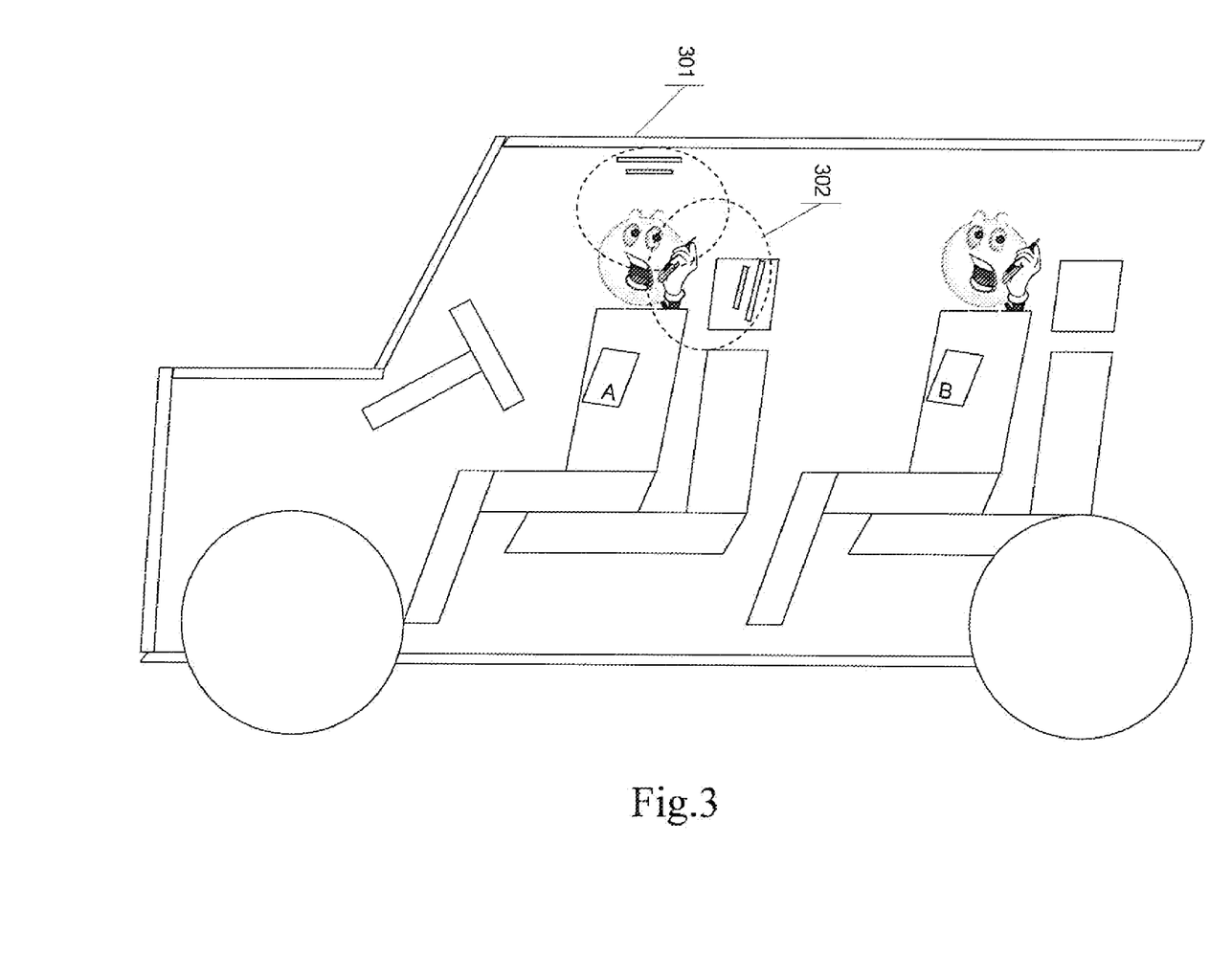
FIG. 3 depicts an illustrative use of a directional antenna in a vehicle according to an embodiment of the invention.

FIG. 3 depicts an illustrative use of a directional antenna in a vehicle according to an embodiment of the invention. The directional antenna may be installed, for example, at the headrest of the driver (as shown at 302) or over the driver's head (as shown at 301). Installing the directional antenna at either of these two locations can assure accurate directional measurement of the communication signal of a handset communication device. If the driver uses an earphone to communicate, then he/she will not be shielded or alerted, because the detection scope of a directional antenna can be designed to be within a limited region around the driver's head. Existing multi-frequency band antenna technology may be utilized so that an antenna may be designed to be sensitive to a respective frequency band of a cell phone (such as CDMA 800 MHz, GSM 900 MHz, DSC 1800 MHz, PCS 1900 MHz, and other frequency bands). The invention has no limitation on the type of directional antenna. For example, the directional antenna can comprise a patched antenna, a Yagi antenna, a log-periodic antenna, a parabolic antenna, a helical antenna, etc. The following description will be directed to a patched antenna, as an example.

Figure 4:
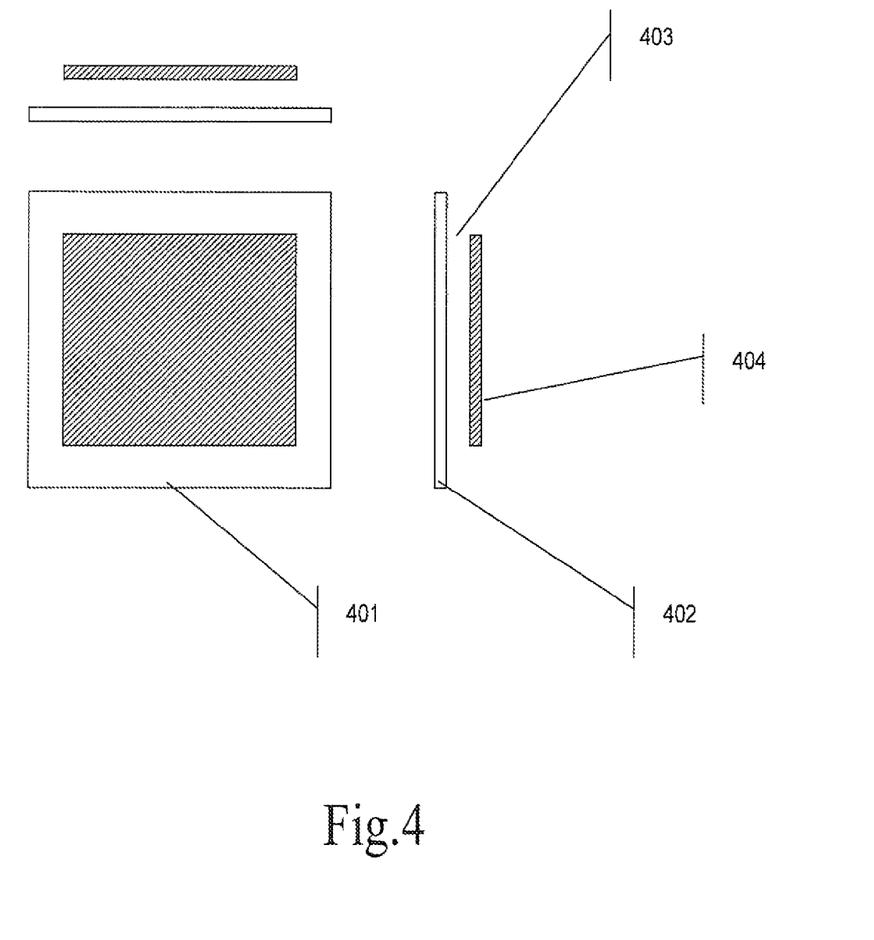
FIG. 4 shows a structural diagram of a directional antenna according to an embodiment of the invention.

FIG. 4 shows an illustrative structural diagram of a directional antenna according to an embodiment of the invention. Due to its durability and ease of manufacture, a patch antenna is one of the most common types of directional antenna. Its shape may be circular, square, rectangle and/or the like, such as a printed circuit board coated by copper. It is composed of one or more metal patches. A patch antenna may be made very small and has direction. Referring to FIG. 4, a square patch antenna is shown, which generally comprises three parts: a ground plane 402, an antenna patch 404, and a dielectric 403 (which may be an air layer or other dielectric material) between the ground plane 402 and the antenna patch 404. The ground plane 402 and antenna patch 404 may be made from copper, aluminum, or other suitable metal material(s).

According to an embodiment of the invention, the gain of the antenna is 7-9 dB and the side length of the patch antenna is 17 cm. It can be determined from the following formula that the use of a 17 cm square patch antenna would make the antenna especially sensitive to the frequency of GSM mobile phones. This size enables the patch antenna to be easily installed at locations over driver's head or at the headrest of the driver. Those skilled in the art can appreciate that the size of the patch antenna may be reduced as performance requirements degrade.

$$\text{side length} = \text{wavelength}/2 = (\text{velocity of light}/\text{frequency})/2 = ((3E+8 \text{ meter}/\text{second})/(900\,E+6\,\text{Hz}))/2 = 0.17 \text{ meter}$$

Those skilled in the art can appreciate that the side length of such a square patch antenna can be generally designed as half of radio wave length.

Those skilled in the art can appreciate that the above formula only gives an embodiment of receiving GSM mobile phone (900 MHz) signal, however, the above antenna can also receive signals having other frequencies. Those skilled in the art can appreciate that shape and size of antenna can be designed as needed, and is not limited to the above design manner.

Figure 5:
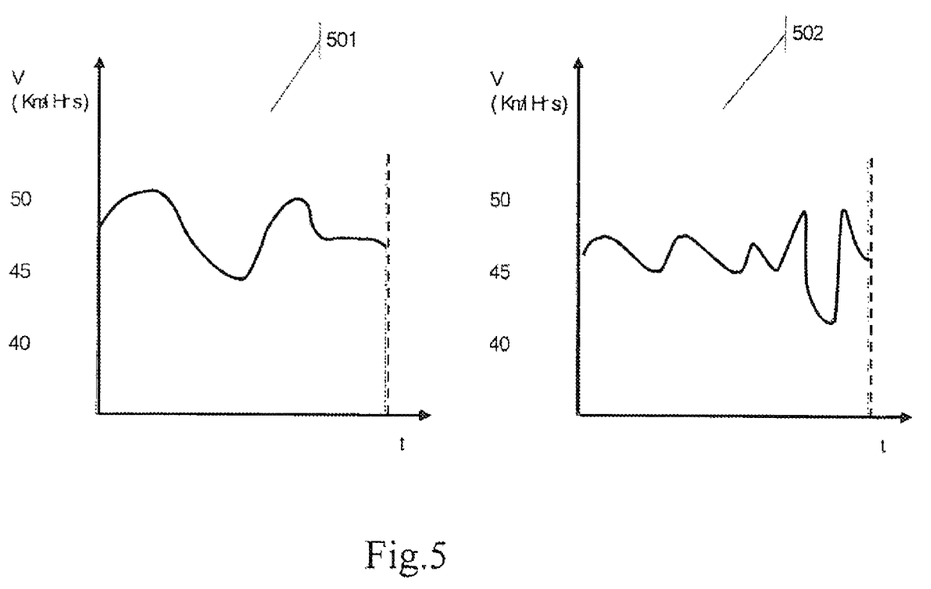
FIG. 5 depicts examples of charts for comparing driving state information within two (previous and next) time windows according to an embodiment of the invention.

FIG. 5 shows an example of charts for comparing driving state information within two (previous and next) time windows according to an embodiment of the invention. According to an embodiment of the invention, judging component 102 further judges whether the driving state of the vehicle is affected by the driver of the vehicle using the handset communication device. In order to determine whether the driving state of the vehicle is affected by driver of the vehicle using the handset communication device, the judging includes comparing whether there is an obvious change in driving state information within two time windows before and after the driver uses the handset communication device. The size of the time window may be dynamically adjusted according to at least one of the following: road condition, traffic condition, and weather condition. For example, for a vehicle driving on a normal road, the time window may be 2 seconds; while for a vehicle driving on a rough road, the time window may be set longer, such as 10 seconds, so as to avoid obvious changes of driving state of the vehicle due to roughness in the road itself (rather than due to the driver using handset communication device). Also, for example, for a vehicle driving on an unblocked express road, the time window may be set relatively shorter; while for a vehicle driving on a road with traffic jam, the time window may be set relatively longer. Also, for example, for a vehicle driving in normal weather conditions, the time window may be set relatively shorter; while for a vehicle driving in a bad weather condition, the time window may be set relatively longer.

According to an embodiment of the invention, obtaining component 101 obtains speed change information of a vehicle and records it in the form of a speed curve. Chart 501 shows an illustrative speed curve within a time window before a driver uses a handset communication device, and chart 502 shows a speed curve within a time window after the driver uses the handset communication device. It can be judged whether there is obvious change in the two speed curves through various graph comparison algorithms (such as dynamic time warping, Fourier transformation, B-spline function fitting, autoregressive model, etc.). Speed jitter in chart 502 is more frequent than that in chart 501, thus it is possible to consider that there is obvious change in the two speed curves even if both average speeds of chart 501 and chart 502 are not very high (such as, both of which have not exceeded 60 km/hour).

According to another embodiment of the invention, the vertical axis of the curve may also represent a vehicle's acceleration, gas pedal pressure, brake pedal pressure, steering wheel rotation angle, vehicle wheel angle, and so on. The curve may be recorded in a certain time window, and the above information varies with time.

According to another embodiment of the invention, driving state information of a vehicle may be recorded by using some discrete values rather than using curves. For example, a change in gear position may be recorded by using discrete values, and these discrete values can be compared so as to judge whether there is obvious change between these discrete values.

Figure 6A:
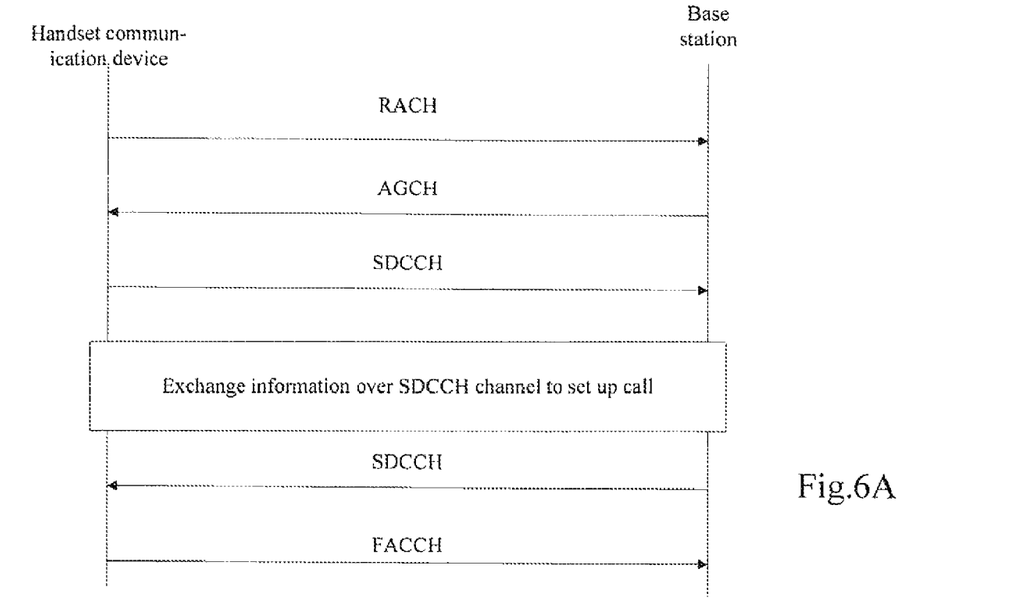
FIG. 6A shows a schematic diagram of a call setup in which a driver is a caller according to an embodiment of the invention.

FIG. 6A shows a schematic diagram of a call setup in which a driver is a caller according to an embodiment of the invention. First, the caller issues a call request over RACH (random access channel), that is, sends a short burst signal to a base station. Then, the base station assigns SDCCH (dedicated control channel) through AGCH (access grant channel) to notify the caller that a wireless link the caller required has been approved by the base station. Next, the caller sends a service request message over SDCCH to request a call setup. After the system successfully authenticates the message, at the stage of exchanging information over SDCCH, the legal identity of calling user has been confirmed and the user has access to the network, more detailed information is required to continue the call. At this point, the caller will send a set up message which carries therein more detailed information such as the callee's number and caller's identifier, etc. After receipt of this message, it first obtains relevant service information of the user, and decides whether this call can be continued or not according to the category of the oncoming service and the service that has been applied by the caller when opening an account. FACCH (fast associated control channel) is used to transmit the necessary signaling message such as switching etc. during the call.

Directional antenna 103 transmits all of the obtained wireless signal to control component 104. Control component 104 itself may also be a wireless terminal, it may transmit a signal to a remote control center, and is authenticated through HLR (home location register) or VLR (visitor location register). The authenticated control component 104 may obtain a corresponding key to decrypt identification information of the caller described above, so as to transmit a special command including identification information of the caller to a remote control center and ask the remote control center to intervene in the above call (such as send an alert tone or terminate the call).

Figure 6B:
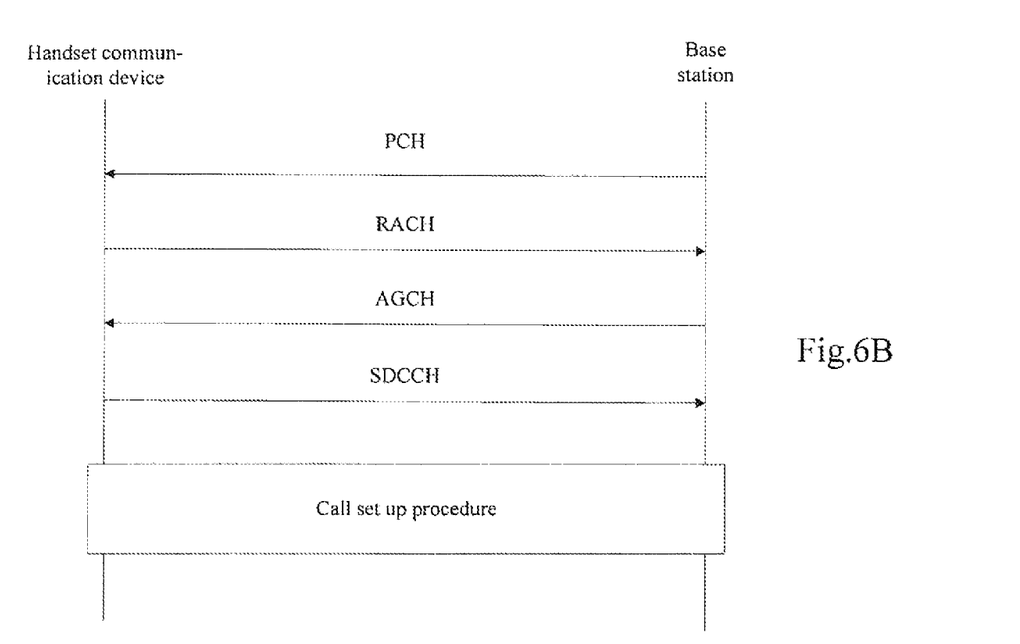
FIG. 6B shows a schematic diagram of a call setup in which a driver is a callee according to an embodiment of the invention.

FIG. 6B shows a schematic diagram of call setup in which driver is a callee according to an embodiment of the invention. First, the base station sends down a paging message over PCH (paging channel), wherein the paging message contains identification information of the caller and callee. Then, after the callee who listens to the channel receives the paging message, it sends a paging response message over RACH (random access channel). Next, the base station responds to the access request of the callee over AGCH, that is, assigns SDCCH. Thereafter, the callee responds over SDCCH so as to start to set up the call.

As described above, directional antenna 103 transmits all of the obtained wireless signal (including paging message with identification information of the callee) to control component 104. The authenticated control component 104 can obtain a corresponding key to decrypt identification information of the callee, thereby transmitting a special command including identification information of the callee to the remote control center and asking the remote control center to intervene in the above call (such as sending an alert tone or terminating call).

Those skilled in the art can appreciate that, although the above description takes typical GSM communication as an example, the invention is not limited to GSM communication pattern, and the invention may also be applied to other communication patterns (such CDMA, 3G, etc.). As long as the communication signal can be obtained from wireless signal and user identification information can be obtained by decrypting the communication signal, a remote control signal can be transmitted to a remote control center to intervene in the handset communication device that is under call.

Figure 7:
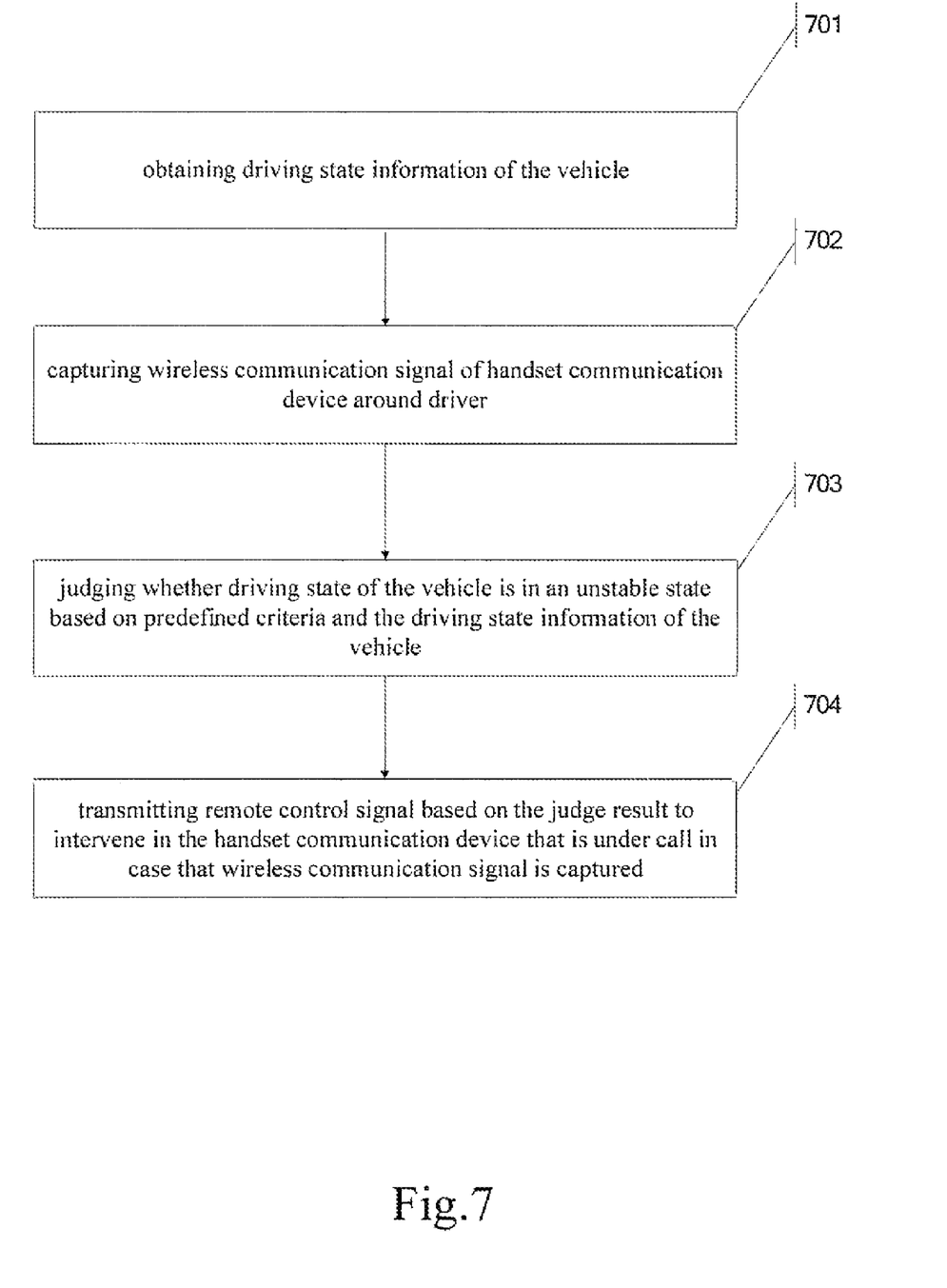
FIG. 7 shows a flow chart of a method for controlling the use of a handset communication device for communication by a driver while a vehicle is in driving state according to an embodiment of the invention.

FIG. 7 shows a flow chart of a method for controlling a driver's communication via a handset communication device while a vehicle is in driving state according to an embodiment of the invention. The method first obtains driving state information of the vehicle in step 701. Then, a wireless communication signal of handset communication device around driver is captured in step 702. In step 703, the method judges whether the driving state of the vehicle is in an unstable state based on predefined criteria and the driving state information of the vehicle. In the case that a wireless communication signal is captured, a remote control signal is transmitted based on the judging result to intervene in the handset communication device that is under call in step 704.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer system or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer system or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A system for controlling use of a handset communication device for communication by a driver while a vehicle is in driving state, comprising:
    an obtaining component for obtaining driving state information of the vehicle;
    a directional antenna for capturing a wireless communication signal of the handset communication device around the driver;
    a judging component for judging whether a driving state of the vehicle is in an unstable state based on predefined criteria and the driving state information of the vehicle, wherein the judging component further judges whether the driving state of the vehicle is affected by the driver of the vehicle using the handset communication device and determines whether there is an obvious change in the driving state information within two time windows before and after the driver uses the handset communication device; and
    a control component for transmitting a remote control signal, based on a judging result of the judging component, to intervene in a communication of the handset communication device during a call.

2. The system according to claim 1, wherein the driving state information of the vehicle comprises internal data of the vehicle, the internal data of the vehicle comprising at least one of: speed, acceleration, gear position, gas pedal pressure, brake pedal pressure, steering wheel rotation angle, and wheel angle.

3. The system according to claim 1, wherein the driving state information of the vehicle comprises external data of the vehicle, the external data of the vehicle comprising at least one of: a distance from an object at the front of the vehicle and a moving speed of an object at the front of the vehicle.

4. The system according to claim 3, wherein the external data of the vehicle is obtained using a radio wave sensor, an infrared sensor, or an optical sensor.

5. The system according to claim 1, wherein a size of the time window is dynamically adjusted according to at least one of: road condition, traffic condition, and weather condition.

6. The system according to claim 1, wherein the directional antenna comprises a patch antenna.

7. The system according to claim 1, wherein the control component obtains user identification information by decrypting the communication signal of the handset communication device captured by the directional antenna.

8. The system according to claim 1, wherein the control component transmits a remote control signal to a telecommunication operator to direct the telecommunication operator to send an alert tone to the driver via the handset communication device.

9. The system according to claim 1, wherein the control component transmits a remote control signal to a telecommunication operator to direct the telecommunication operator to terminate the call of the handset communication device.

10. A vehicle comprising:
    a detecting component for detecting driving state information of the vehicle; and a system for controlling use of a handset communication device for communication by a driver while the vehicle is in driving state, comprising:
- a directional antenna for capturing a wireless communication signal of the handset communication device around the driver;
- a judging component for judging whether a driving state of the vehicle is in an unstable state based on predefined criteria and the driving state information of the vehicle, wherein the judging component further judges whether the driving state of the vehicle is affected by the driver of the vehicle using the handset communication device and determines whether there is an obvious change in the driving state information within two time windows before and after the driver uses the handset communication device; and
- a control component for transmitting a remote control signal, based on a judging result of the judging component, to intervene in a communication of the handset communication device during a call.

11. A method for controlling use of a handset communication device for communication by a driver while a vehicle is in driving state, comprising:
- obtaining driving state information of the vehicle;
- capturing a wireless communication signal of the handset communication device around the driver;
- judging whether the driving state of the vehicle is in an unstable state based on predefined criteria and the driving state information of the vehicle, wherein the judging further judges whether the driving state of the vehicle is affected by the driver of the vehicle using the handset communication device and determines whether there is an obvious change in the driving state information within two time windows before and after the driver uses the handset communication device; and
- transmitting a remote control signal, based on the judging result, to intervene in a communication of the handset communication device during a call.

12. The method according to claim 11, wherein the driving state information of the vehicle comprises internal data of the vehicle, the internal data of the vehicle comprising at least one of: speed, acceleration, gear position, gas pedal pressure, brake pedal pressure, steering wheel rotation angle, and wheel angle.

13. The method according to claim 11, wherein the driving state information of the vehicle comprises external data of the vehicle, the external data of the vehicle comprising at least one of: a distance from an object at the front of the vehicle and a moving speed of an object at the front of the vehicle.

14. The method according to claim 11, wherein transmitting a remote control signal further comprises:
- obtaining user identification information by decrypting the communication signal of handset communication device captured by the directional antenna.

15. The method according to claim 11, wherein transmitting a remote control signal further comprises:
- transmitting the remote control signal to a telecommunication operator to direct the telecommunication operator to send an alert tone to the driver via the handset communication device.

16. The method according to claim 11, wherein the step of transmitting control signal further comprises:
- transmitting the remote control signal to a telecommunication operator to direct the telecommunication operator to terminate the call of the handset communication device.

* * * * *